United States Patent [19]

Takeda

[11] 4,428,244

[45] Jan. 31, 1984

[54] APPARATUS FOR MEASURING INTERNAL STRESS OF STRIP DURING ROLLING PROCESS

[75] Inventor: Yukiyasu Takeda, Nagoya, Japan

[73] Assignee: Sumitomo Light Metal Industries, Ltd., Tokyo, Japan

[21] Appl. No.: 323,606

[22] Filed: Nov. 20, 1981

[51] Int. Cl.³ .............................................. G01L 5/04
[52] U.S. Cl. ................................... 73/862.07; 72/17; 73/862.48
[58] Field of Search ................ 73/862.07, 159; 72/17, 72/236, 39

[56] References Cited

U.S. PATENT DOCUMENTS 4,024,755 5/1977 Quehen ........................ 73/862.48 X
4,300,403 11/1981 Berger et al. .................... 73/862.07

FOREIGN PATENT DOCUMENTS 836535 6/1981 U.S.S.R. ............................... 73/159

Primary Examiner—Gerald Goldberg
Assistant Examiner—Brian Tumm
Attorney, Agent, or Firm—Flynn, Thiel, Boutell & Tanis

[57] ABSTRACT

An apparatus is disclosed for measuring the internal stress generated in a strip in the width direction thereof in the course of a rolling process thereof, comprising a plurality of ring-shaped stress detection mechanisms with small gaps therebetween, which stress detection mechanisms are in contact with the surface of the strip; and a gas ejection mechanism for ejecting gases from the gaps between the ring-shaped stress detection mechanisms.

7 Claims, 5 Drawing Figures

APPARATUS FOR MEASURING INTERNAL STRESS OF STRIP DURING ROLLING PROCESS

BACKGROUND OF THE INVENTION

The present invention relates to an apparatus for measuring the internal stress of a strip during the rolling process thereof, which apparatus is employed for adjustment and control of pressure application in a rolling mill.

A conventional rolling mill has the shortcoming of generating non-uniform internal stress from place to place in each strip, such as in aluminum strips, in the course of the rolling process, due to slight changes in the gap or pass between the work rolls, caused, for instance, by heat generated during the rolling. The non-uniform internal stress generated in the rolled strip has a variety of adverse effects on the working of the rolled strip following the rolling process.

Therefore, it is necessary that the internal stress generated in the rolled strip be continuously measured during the rolling process, and that the pressure applied to the strip by the work rolls be appropriately adjusted in accordance with the feed back signal indicating the measured internal stress.

SUMMARY OF THE INVENTION

It is therefore an object of the present invention to provide an apparatus for measuring the internal stress generated in a strip during the rolling process thereof, which apparatus is capable of measuring the internal stress continuously, without smearing the rolled surface of the strip.

According to the present invention, the above-mentioned object is attained by an internal stress measurement apparatus in the shape of a segmented roll, which rotates in contact with the surface of the strip being roll processed, which strip is caused to run under application of tension thereto, so that the distribution of the internal stress generated in the rolled strip in the direction of the width thereof is measured. This apparatus comprises a stress measurement mechanism with a plurality of ring-shaped stress detection mechanisms with small gaps therebetween, and a gas ejection mechanism for ejecting gases from the gaps.

According to the present invention, the internal stress generated in the rolled strip can be measured accurately in the course of the rolling process and, moreover, because gases are ejected from the gaps between the stress detection mechanisms upon the surface of the rolled strip during the rolling process, the surface of the rolled strip is not stained with rolling oil applied thereto during the rolling process itself.

DETAILED DESCRIPTION OF THE PREFERRED EMBODIMENT

Figure 1:
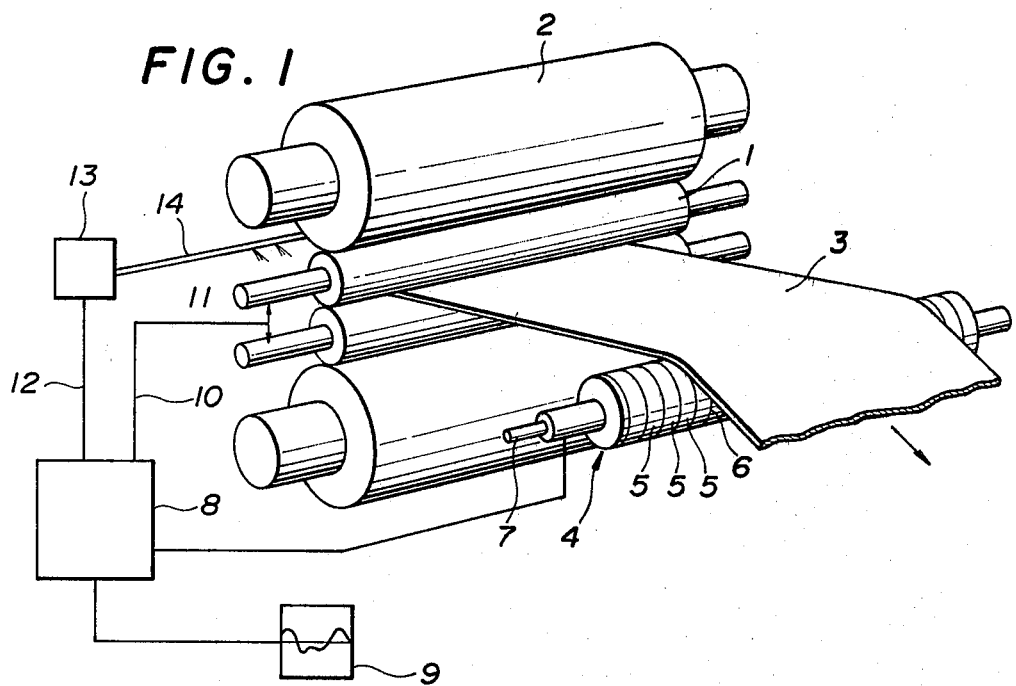
FIG. 1 is a schematic perspective view of a rolling mill in which an embodiment of an apparatus according to the present invention is employed.

Referring to FIG. 1, there is schematically shown an embodiment of an apparatus for measuring the internal stress generated in a rolled strip according to the present invention, which is applied to a rolling mill.

In the figure, reference numeral 1 represents a pair of work rolls; reference numeral 2, a pair of back-up rolls; and reference numeral 3, a strip. The strip 3 is caused to run in the direction of the arrow under application of tension thereto. Under the strip 3, there is disposed an internal stress measurement apparatus 4 according to the present invention.

The internal stress measurement apparatus 4 is in the shape of a segmented roll, provided with a stress measurement mechanism comprising a plurality of ring-shaped stress detection mechanisms 5 with small gaps 6 therebetween, and the gas supplied through an inlet of a gas supply pipe 7 is emitted from the small gaps 6 between the ring-shaped stress detection mechanisms 5.

Each stress detection mechanism 5 is capable of measuring the stress generated in each portion of the strip 3 with which those stress detection mechanisms 5 are in contact. The measured value is transmitted to a control apparatus 8, so that the measured stress can be monitored on a display screen 9. At the same time, a control command is applied to a bending mechansim 11 through a line 10, so that the distribution of the stress in the strip 3 in the width direction thereof is made uniform by adjusting the work rolls 1 appropriately.

Furthermore, by the control command, a water supply mechanism 13 is actuated through a line 12 and water is ejected from a pipe 14 so as to cool the necessary portions of the work rolls 1, whereby the pass between the work rolls 1 is maintained appropriately. As a result, the distribution of the stress in the strip 3 in the width direction thereof can be made uniform. The bending mechanism 11 and the water supply mechanism 13 can be selectively used in accordance with the non-uniform state of the distribution of the stress in the strip 3.

Since the stress detection mechanisms 5 include small gaps 6 therebetween, there is the risk that rolling oil will enter the gaps 6 and the surface of the strip 3 will be smeared with the rolling oil.

In the present invention, however, gases, preferably air, are supplied to the gas supply pipe 7 passes through a gas flow passage or passages in or around the roll and are ejected from the gaps 6. Thus, the rolling oil is prevented from entering the gaps 6.

Figure 2:
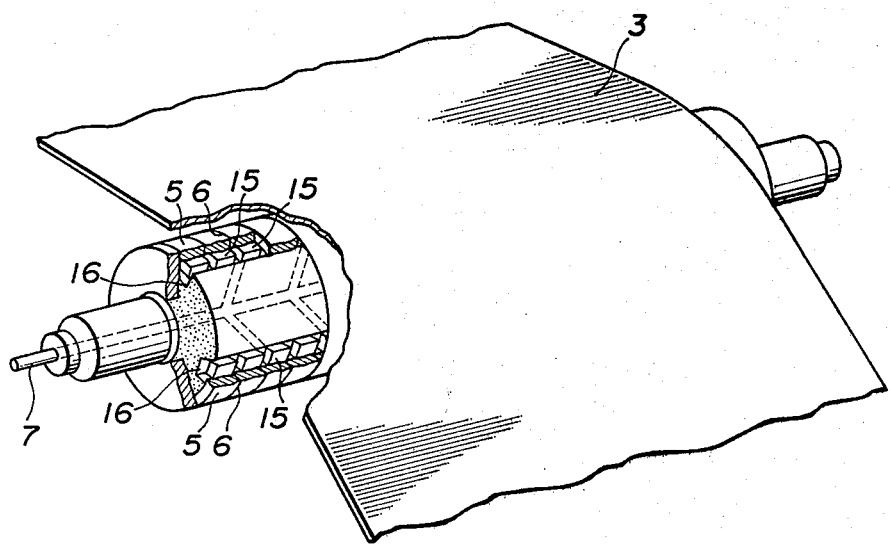
FIG. 2 is a partially cutaway, enlarged view of the main portion of the rolling mill shown in FIG. 1.

FIG. 2 is a partially cutaway, perspective view of the stress detection mechanisms 5 for use in the present invention. Inside the stress detection mechanisms 5, there are disposed stress detection members 15 which are fitted in axially-extending grooves 16. The internal stress in each portion of the strip 3 is transmitted to the stress detection mechanisms 5 and is then detected by the stress detection members 15. The detected stress is transmitted to the control apparatus 8 through the previously mentioned line, and a gas, preferably air, supplied from the gas supply pipe 7, is ejected from the gaps 6 through the grooves 16.

Figure 3:
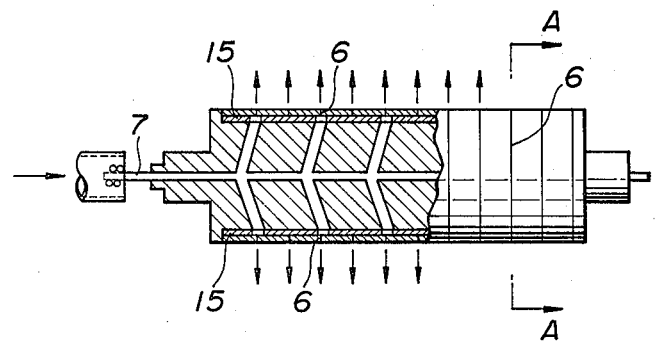
FIG. 3 is a partially cutaway front view of a gas ejection mechanism that can be employed in the present invention.
Figure 4:
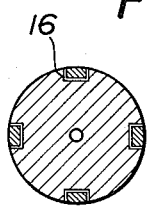
FIG. 4 is a cross section taken on line A-A in FIG. 3.

Referring to FIG. 3, there is shown a partially cutaway front view of the gas supply mechanism for use in the present invention. FIG. 4 is a cross section of the gas supply mechanism taken on line A-A in FIG. 3.

The gas supplied to the gas supply tube 7 reaches the grooves 16, taking paths or passages branched from the center of the gas supply tube or passage 7, and diffuses along the grooves 16 in the axial direction of the stress detection mechanism 5 and is then ejected outside.

Figure 5:
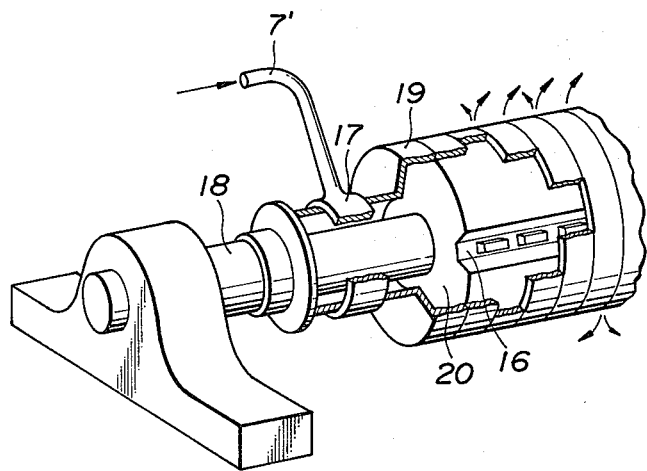
FIG. 5 is a partially cutaway perspective view in explanation of another gas ejection mechanism that can be employed in the present invention.

Referring to FIG. 5, there is shown another example of the gas ejection mechanism wherein the segmented roll is rotatably mounted on a base at opposite axial ends thereof. In this example, a gas passes through a gas supply tube 7' and an air ring 17, and then reaches the grooves 16 through a passage constructed of a shaft 18 and an end cover 19, and is finally ejected outside from the grooves 16.

What is claimed is:

1. An apparatus for measuring the internal stress generated in a strip in the width direction thereof in the course of rolling process thereof, comprising:
    a plurality of separate, ring-shaped stress detection mechanisms arranged coaxially with each other and side-by-side with small gaps therebetween, said stress detection mechanisms being adapted to contact the surface of the strip passing thereon under tension, each of said stress detection mechanisms having a stress detection means therein for detecting the internal stress during passage of the strip over said stress detection mechanism; and
    a gas ejection mechanism for ejecting gases through said gaps between said ring-shaped stress detection mechanisms in order to prevent rolling oil from penetrating into said gaps.

2. An apparatus for measuring the internal stress across the width of a thin, flat strip which is under tension in the lengthwise direction thereof and is moving in the lengthwise direction thereof, comprising:
    a cylindrical roll mounted for rotation about an axis extending transverse to the direction of movement of said strip;
    a plurality of coaxial, adjacent, annular stress detection mechanisms mounted on said cylindrical roll coaxially therewith, said stress detection mechanisms being stacked in the axial direction of said roll substantially in end-to-end contact with each other such that said stress detection mechanisms define thin, annular, radially-extending gaps therebetween, said stress detection mechanisms being effective for measuring the internal stress in the moving strip across the width thereof when the strip is moved over and exerts pressure in radial directions on a portion of the peripheral surfaces of said stress detection mechanisms, said stress detection mechanisms and said roll rotating in the direction of travel of said strip, said stress detection mechanisms and said roll together defining gas flow passage means therein which communicates with the radially inner ends of said gaps; and
    means for supplying pressurized gas to said gas flow passage means, whereby said gas flow through said gas flow passage means as said strip moves over said stress detection mechanisms, and said gas then flows radially outwardly through said gaps so as to prevent oil from penetrating into said gaps.

3. An apparatus as claimed in claim 2, wherein said gas flow passage means has an inlet formed on an axial end of said roll, and said gas flow passage means comprises a central axial channel which extends along the axis of said cylindrical roll, and a plurality of branch passages which extend radially from said central axial passage to said gaps between said stress detection mechanisms.

4. An apparatus according to claim 2, wherein said means for supplying pressurized gas comprises an end cover which encloses one axial end of said roll and is disposed axially outwardly of and adjacent to an end one of said stress detection mechanisms, said cylindrical roll having a plurality of axially extending grooves in the periphery thereof, whereby said pressurized air flows into said end cover, then flows from the interior of said end cover to said grooves in said cylindrical roll, then flows radially outwardly through said gaps.

5. An apparatus according to claim 2, wherein said cylindrical roll has a plurality of axially extending grooves in the periphery thereof, and said stress detection mechanisms each comprise an annular ring and a plurality of stress detection members adjacent thereto disposed in each of said axially extending grooves in said cylindrical roll.

6. An apparatus as claimed in claim 5, wherein said cylindrical roll has four of said axially extending grooves therein, and each of said stress detection mechanisms has four of said stress detection members, said stress detection members being spaced apart from each other by angles of 90 degrees.

7. An apparatus according to claim 3, wherein said cylindrical roll has a plurality of axially extending grooves in the periphery thereof, and said stress detection mechanisms each comprise an annular ring and a plurality of stress detection members adjacent thereto disposed in each of said axially extending grooves in said cylindrical roll, said branch passages extending to and being in communication with said axially extending grooves, at least one branch passage being associated with each of said grooves.

* * * * *